United States Patent Office 3,460,175
Patented Aug. 12, 1969

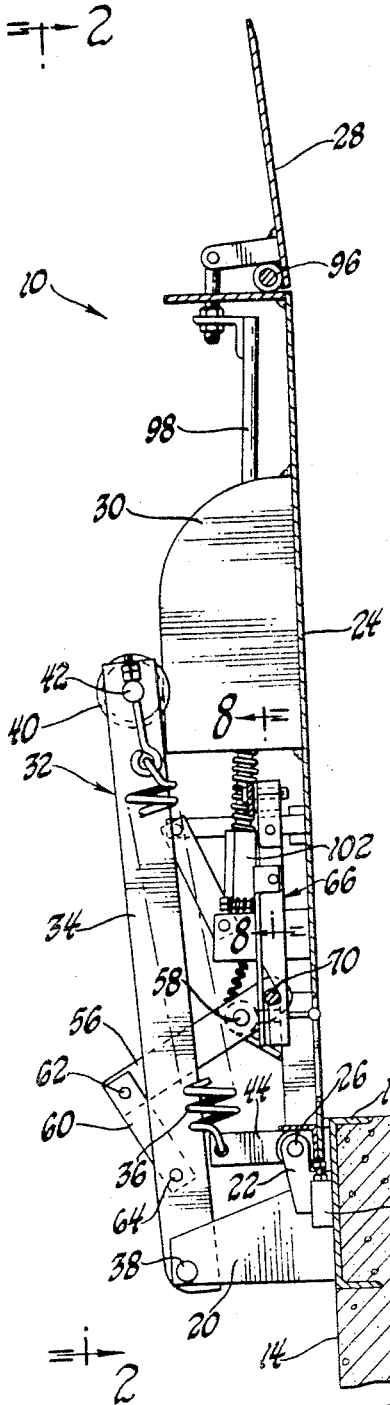
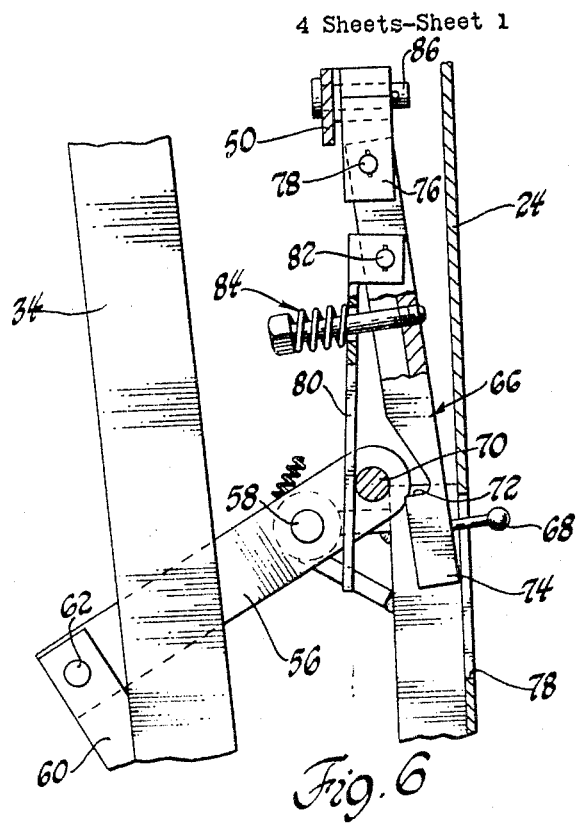
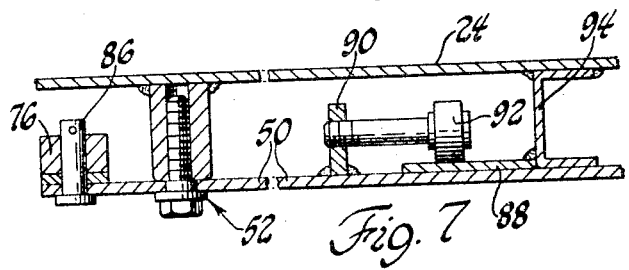
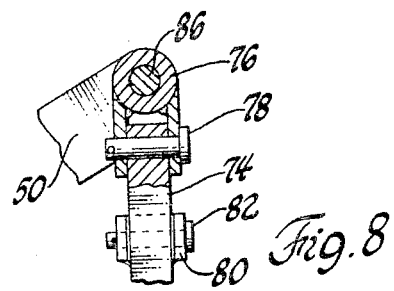

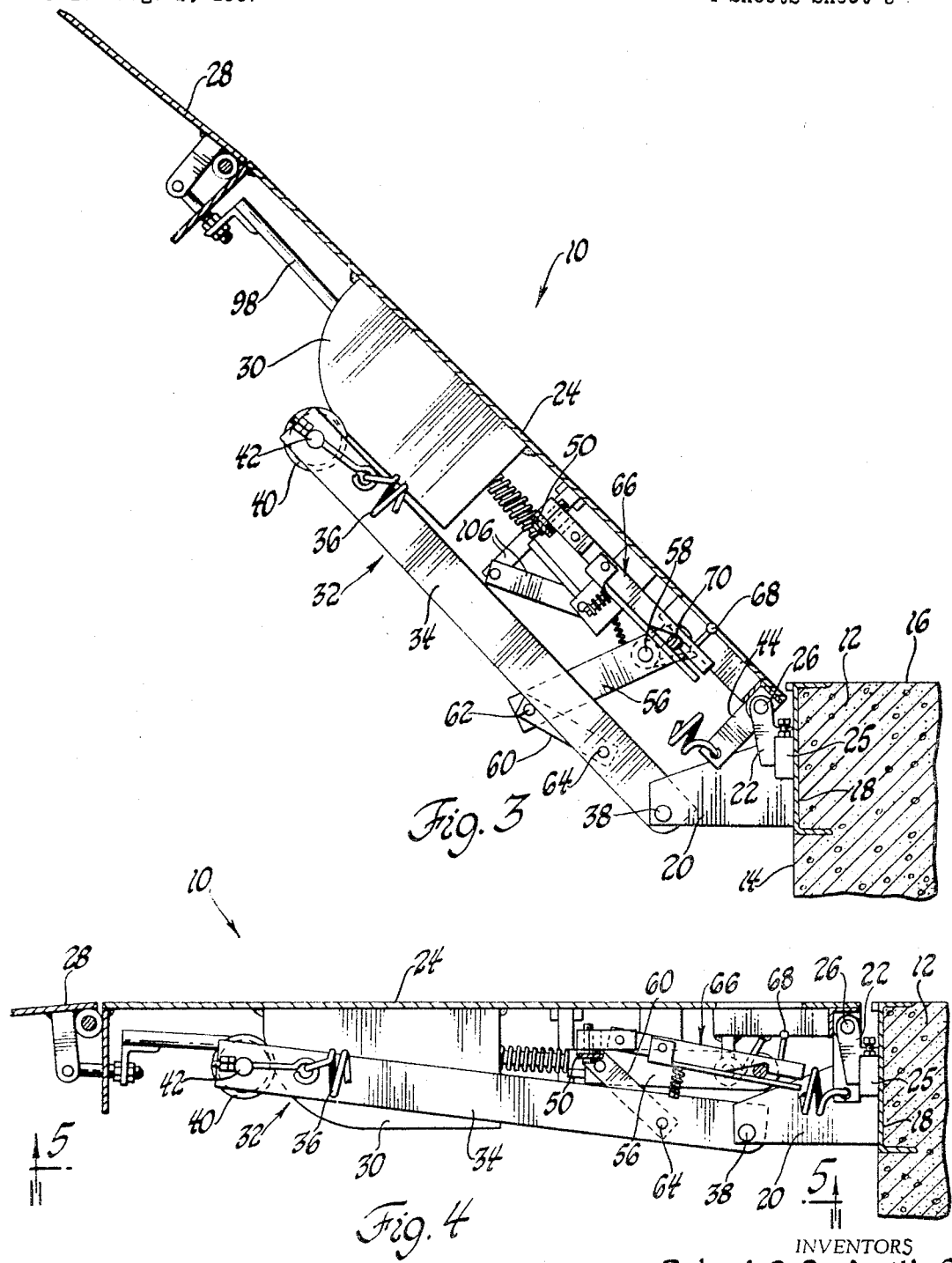

3,460,175
DOCKBOARD ASSEMBLY
Robert C. Beckwith, Milwaukee, Wis., and Robert W. Hecker, Jr., Clare, Mich., assignors to Loomis Machine Company, Clare, Mich., a corporation of Michigan
Filed Aug. 2, 1967, Ser. No. 657,989
Int. Cl. B65g *11/12, 11/18;* E01d *15/00*
U.S. Cl. 14—71                                14 Claims

ABSTRACT OF THE DISCLOSURE

A dockboard assembly comprising a support means attached to a loading dock and a ramp pivotally connected at a first end thereof to the support means and adapted through a pivotal lip at the second end thereof for coaction with a vehicle whereby traffic may move over the ramp between the dock and the vehicle. The ramp is pivotal between various lowered positions and a substantially vertical stored position. Lift springs are included for urging the ramp toward the raised position. A weight arm is pivotally connected to the bottom of the ramp and supports a weight at one end thereof. The weight arm coacts with linkage at the other end thereof to be pivoted thereby for moving the weight between a low moment position adjacent the end of the ramp pivotally attached to the support means and a high moment position adjacent the distal or second end of the ramp to overcome the biasing means and maintain the ramp in a lowered position. There is also included a second spring means urging the weight toward the low moment position adjacent the pivotal connection of the ramp to the support structure so that when the weight is moved from the high moment position to the low moment position, the lift springs pivot the ramp from the lowered position to the vertical raised position.

---

The dockboard assembly to which the instant invention pertains is of the type normally disposed at the front wall of a dock to span the space between the front wall of a dock and a vehicle to allow traffic to pass between the dock and the vehicle for loading or unloading the vehicle. As an example, such dockboards are frequently utilized with docks which are spaced a short distance from a railroad track to span the distance between the dock and a railroad car on the track. Such dockboards are normally stored in a substantially vertical position and are pivotally mounted for movement to a substantially horizontal position to coact with the vehicle to be unloaded or loaded, e.g., a railroad car.

Normally, such prior art dockboards include power actuated devices, such as hydraulic cylinders, electric motors, or the like, for moving the dockboard between the vertical and the horizontal positions. The power actuated devices are operated after the dockboard has been utilized to load or unload a vehicle to move the dockboard from the horizontal to the substantially vertical position. Heretofore it has been necessary to utilize such power actuated devices to alleviate the necessity for an operator to leave the dock and stand on the ground in the space between the dock and the vehicle to manually raise the dockboard. In other words, the prior art dockboards utilize power devices so that the dockboard may be raised and lowered by an operator remaining on the dock.

There is no satisfactory prior art dockboard, however, which utilizes a completely mechanical mechanism without power actuated means, such as electric motors or hydraulics, and allows an operator to move the dockboard back and forth between the substantially vertical stored position and the horizontal position while remaining on the dock and with a minimal effort.

Accordingly, it is an object and feature of this invention to provide a dockboard adapted to be disposed at the front wall of a dock and including non-power actuated mechanical means for moving the dockboard between the lowered and raised positions as controlled by an operator on the dock.

Another object and feature of this invention is to provide a dockboard assembly including a support means adapted for attachment to a front wall of a dock with a ramp pivotally attached to the support means for pivotal movement between various lowered positions and a substantially vertical raised position with biasing means urging the ramp toward the raised position and control means operatively attached to the ramp for providing a moment due to gravity sufficient to maintain the ramp in a lowered position and for changing the moment due to gravity while the ramp is in a lowered position so that the ramp is pivoted toward the raised position by the biasing means.

A further object and feature of this invention is to provide a dockboard assembly including a ramp pivotally mounted for movement between various lowered positions and a substantially vertical position with biasing means urging the ramp toward the raised position and a weight operatively connected to the ramp for movement between a low moment position adjacent the pivotal connection of the ramp, whereat the biasing means pivots the ramp from a lowered position to the raised position, and a high moment position adjacent the distal end of the ramp to overcome the biasing means and to maintain the ramp in a lowered position.

Other objects, features and attendant advantages of the present invention will be readily appreciated as the same becomes better understood by reference to the following detailed description when considered in connection with the accompanying drawings wherein:

FIGURE 1 is a cross-sectional view of a preferred embodiment of the instant invention showing the ramp in the substantially vertical stored position;

FIGURE 3 is a cross-sectional view similar to FIGURE 1 but showing the ramp in an intermediate position;

FIGURE 4 is a fragmentary cross-sectional view similar to FIGURES 1 and 3 but showing the ramp in a lowered position;

FIGURE 6 is an enlarged fragmentary cross-sectional view showing a portion of the mechanism;

FIGURE 7 is an enlarged fragmentary cross-sectional view taken substantially along line 7—7 of FIGURE 2; and FIGURE 8 is an enlarged fragmentary cross-sectional view taken substantially along line 8—8 of FIGURE 1.

Referring now to the drawings, wherein like numerals indicate like or corresponding parts throughout the several views, a preferred embodicent of a dockboard assembly constructed in accordance with the instant invention is generally shown at 10.

Figure 2:
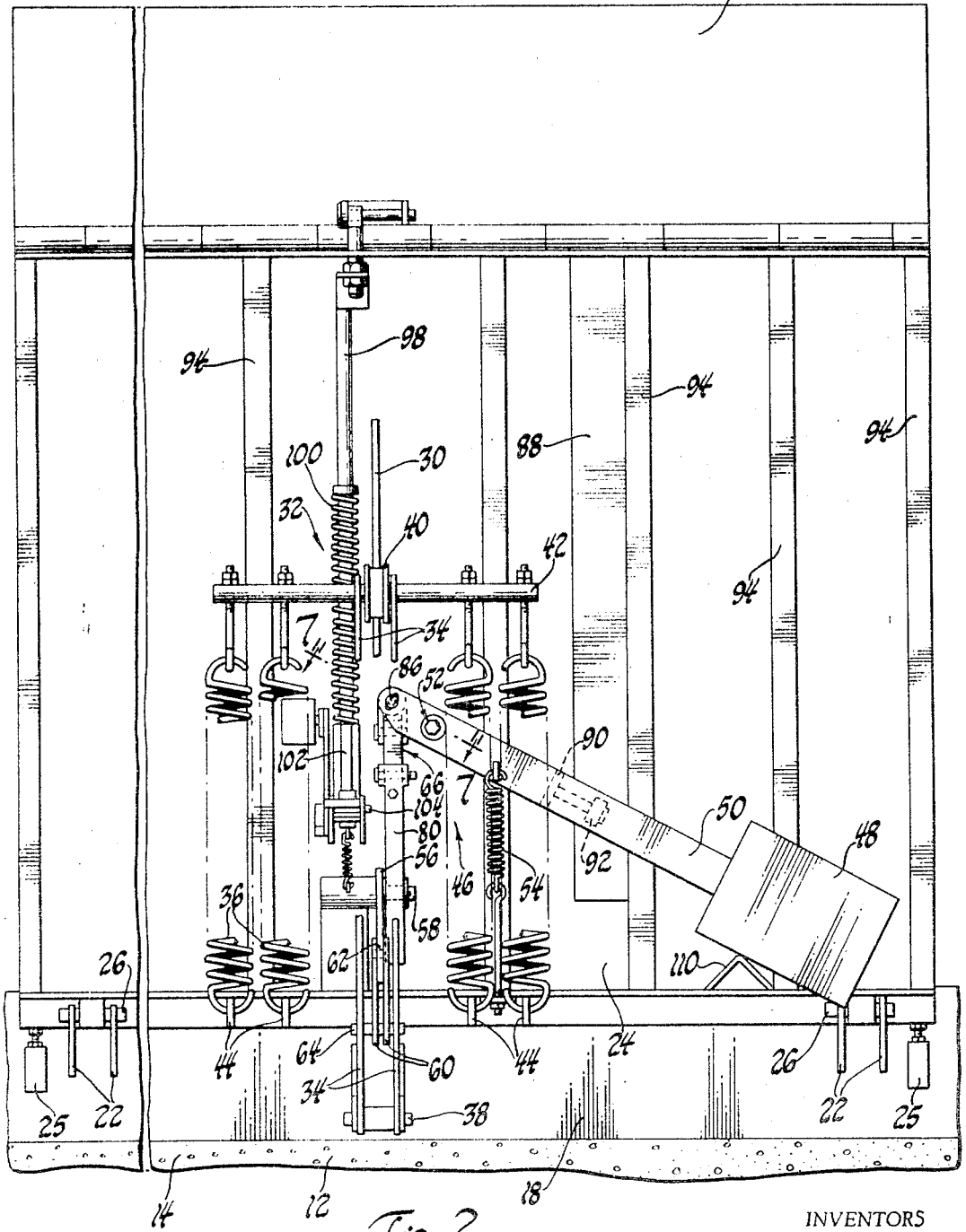
FIGURE 2 is a view taken substantially along line 2—2 of FIGURE 1.

A dock is indicated at 12 and has a front wall 14 and an upper surface 16. There is included a support means 18 attached adjacent the intersection of the front wall 14 and the upper surface 16 of the dock 12. The support means 18 includes the brackets 20 and 22.

A ramp 24 is pivotally connected by pins 26 at a first end thereof to the brackets 22 of the support means. The ramp 24 pivots between various lowered positions, one of which is shown in FIGURE 4, and a substantially vertical-raised-storage position as shown in FIGURE 1.

The second end of the ramp 24 is adapted by a lip 28 to engage a vehicle, e.g., the bed of a truck or the floor of a railway car. The stops 25 engage the rearward or first end of the ramp 24 to support the ramp 24 in the substantially vertical position illustrated in FIGURE 1.

A cam plate 30 is secured to the bottom of the ramp. A first biasing means, generally indicated at 32, urges the ramp 24 toward the raised position illustrated in FIGURE 1. More specifically, the first biasing means 32 includes a lift arm 34 and spring means 36. The lift arm 34 is pivotally connected at a first end thereof through the pin 38 to the brackets 20 of the support means. The lift arm 34 rotatably supports a cam follower 40 at a second end thereof, and the cam follower engages the cam 30. A rod or bar 42 extends laterally from the second end of the lift arm 34. The spring means 36 include a plurality of heavy-duty springs interconnecting the bar 42 and extensions 44 which protrude from the ramp. It will be understood that the spring means 36 may interconnect the bar 42 and the support means while performing the same function as in the embodiment illustrated. Thus, the spring means 36 in effect interconnect the lift arm 34 and either the support means or the ramp 24 adjacent the pivotal connection of the ramp to the support means.

Figure 5:
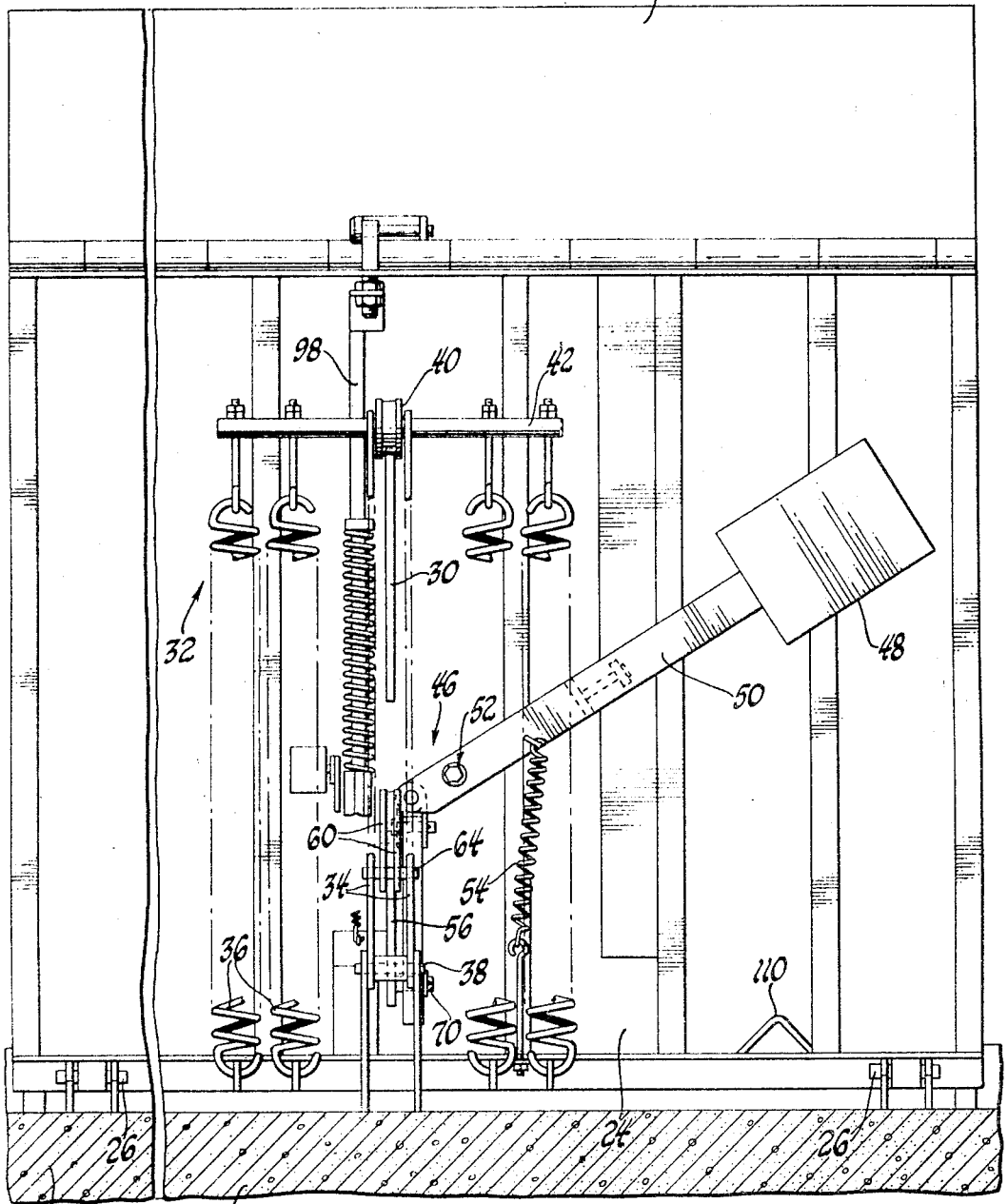
FIGURE 5 is a view taken substantially along line 5—5 of FIGURE 4.

There is also included a control means generally indicated at 46 in FIGURES 2 and 5 and operatively attached to the ramp 24 for providing a moment due to gravity sufficient to maintain the ramp 24 in a lowered position, as illustrated in FIGURE 4, and for changing the moment due to gravity when or while the ramp is in a lowered position so that the ramp is pivoted toward the raised position illustrated in FIGURE 1 by the first biasing means 32. More specifically, the control means 46 includes a weight 48 which is movable relative to the ramp 24 between a low moment position adjacent the pivoted end of the ramp, as illustrated in FIGURE 2, and a high moment position adjacent the distal or second end of the ramp, as illustrated in FIGURE 5. The weight 48 is attached to one end of a weight arm 50. The weight arm 50 is pivotally attached intermediate the ends thereof to the bottom side of the ramp as indicated at 52. The control means includes linkage means for moving the weight 28 from the low moment position to the high moment position in response to pivotal movement of the ramp 24. The other end of the weight arm 50 coacts with the linkage means so that the weight 48 is moved in an arc between the low and high moment positions.

A second biasing means comprising the spring 54 urges the weights 48 toward the low moment position as illustrated in FIGURE 2.

The linkage means includes a lever 56 pivotally connected to the ramp 24 by the pin 58 and responsive to relative pivotal movement between the ramp 24 and the support means to pivot the weight arm 50 and thereby move the weight 48 as the ramp is pivoted downwardly from the vertical position. There is included an actuating means comprising the links 60 interconnecting the lift arm 34 and the lever 56 for pivoting the lever 56 upon movement of the lift arm 34. The links 60 are pivotally connected at one end 62 to one end of the lever 56 and are pivotally connected at the other end 64 to the lift arm 34.

The linkage means also includes a latch means comprising the latch link, generally indicated at 66, for maintaining the weight 48 in the high moment position against the urging of the spring 54, such position being illustrated in FIGURE 5. There is also included a release means including the handle 68 for releasing the latch link 66 so that the spring 54 moves the weight 48 to the low moment position illustrated in FIGURE 2. As will become more clear hereinafter, the spring means 36 have sufficient tension thereon to pivot the ramp 24 from the lowered position illustrated in FIGURE 4 to the substantially vertical upright position illustrated in FIGURE 1 when the weight 48 is moved to the low moment position illustrated in FIGURE 2, but cannot pivot the ramp 24 to the vertical position when the weight 48 is in the high moment position illustrated in FIGURE 5. In other words, the springs 36 can overcome the moment due to the weight of the ramp and weight when the weight 48 is adjacent the pivoted end of the ramp, this being a low moment position, but the springs 36 cannot overcome the high moment resulting when the weight 48 is adjacent the second or outward end of the ramp.

A pin 70 is supported by one end of the lever 56. The latch link 66 has a latch recess 72 as illustrated in FIGURE 6 for engaging the pin 70. The latch link 66 comprises two members 74 and 76, as illustrated in FIGURES 6. The two members 74 and 76 are pivotally connected together at 78 to allow the latch recess 72 to be disengaged from the pin 70 as illustrated in FIGURE 6. To disengage the latch recess 72 from the pin 70, the handle 68 is manually grasped through the hole 78 in the ramp 24 to pivot the member 74 relative to the member 76. The release means, therefore, coacts with the member 74 having the latch recess 72 therein for moving the latch recess 72 out of engagement with the pin 70. There is also include a guide lever 80 pivotally attached at 82 to the member 74 which has the latch recess 72 therein. The guide lever 80 extends over the latch recess 72 and a third biasing means, generally indicated at 84, urges the guide lever 80 against the pin 70 to maintain the member 74 against the pin 70. When the handle 68 is manually grasped and moved, the member 74 is pivoted against the biasing action of the biasing means 84. The biasing means 84 comprises a bolt threadedly engaging the member 74 with a spring disposed thereabout and engaging the guide lever 80.

The member 76 is rotatably supported on a pin 86 which extends through the weight arm 50.

There is also included a guide means comprising the plate 88, the bracket 90 and the roller 92. A plurality of C-shaped beam or channel members 94 are secured to the bottom of the ramp 24. The plate member 88 is welded or otherwise secured to one of the C-shaped beam members 94. A bracket 90 extends upwardly from the weight arm 50 and supports a shaft upon which the roller 92 is rotatably supported. The roller 92 rolls along an arcuate path on the plate 88 so as to operatively interconnect the weight arm 50 and the ramp 24 for supporting the weight arm 50 intermediate the weight 48 and the pivotal connection 52 of the arm 50 to the ramp 24.

As alluded to hereinbefore, the lip 28 is pivotally attached to the second end of the ramp 24 through a piano hinge arrangement disposed about the shaft 96. There is also included means comprising the rod 98 for locking the lip 28 in an extended cantilevered position, as illustrated in the drawings, and for unlocking the lip 28 to allow the lip 28 to pivot to a position which is substantially perpendicular to the ramp 24 (not shown). The rod 98 comprises two telescoping members which are biased apart by the spring 100. One link has a latch member 102 disposed thereon for locking engagement with the pin 104. When the lip 28 is in the extended cantilevered position as illustrated in the drawings, a force may be applied thereto to pivot the lip 28 downwardly, thus telescoping the links of the rod 98 together to compress the spring 100. The links 106 may be manually actuated to move the locking member 102 out of locking engagement with the pin 104 to allow the lip 28 to move to a position substantially perpendicular to the ramp 24. The rod 98 and its associated mechanism for locking the lip 28 in the extended cantilevered position are more fully described in copending application Ser. No. 558,881, filed in the name of Robert W. Hecker, Jr. on June 20, 1966, and assigned to the assignee of the instant invention, and are a part of the instant invention only insofar as being components of the new and novel combination of the instant invention.

OPERATION

Normally, the dockboard of the instant invention is in the stored position wherein it is substantially vertical as illustrated in FIGURE 1. After a vehicle such as a railroad car is disposed opposite the dock 12 and in spaced relation thereto, the operator manually pivots the lip 28 to the extended cantilevered position as illustrated in FIGURE 1 if the lip 28 is not already in that position. In so doing, the locking member 102 doggedly engages the pin 104 to yieldably support the lip 28 in the extended cantilevered position.

Thereafter, the operator pushes the ramp 24 in a counterclockwise direction as viewed in FIGURE 1 to pivot the ramp 24 toward the horizontal position. The ramp 24 is illustrated in FIGURE 3 as it is moving toward the horizontal position. The ramp 24 is pivoted downwardly against the biasing action of the spring means 36 and rotates the lift arm 34 during such movement. As the lift arm 34 is rotated, the lever 56 is rotated about the pin 58 due to its connection with the lift arm 34 through the links 60. As the lever 56 rotates about the pin 58, the pin 70 carried by the lever 56 moves rearwardly to move the latch link 66 rearwardly. As the latch link 66 is moved rearwardly, the weight arm 50 pivots in a counterclockwise direction about the point 52 as viewed in FIGURE 2. The weight 48, therefore, moves off the stop 110 as the ramp 24 is pivoted downwardly. As the ramp 24 is pivoted toward the horizontal position, the weight 48 moves from the low moment position as shown in FIGURE 2 toward the high moment position as shown in FIGURE 5. Once the ramp 24 has been moved to a lowered position, which is substantially horizontal and whereat the lip 28 is in contact with a vehicle to be loaded or unloaded, the weight 48 is in a high moment position as illustrated in FIGURE 5. When the weight 48 is in the high moment position as illustrated in FIGURE 5, the moment about the pivotal connection 26 of the ramp 24 to the support means is sufficient to overcome the biasing action of the biasing means 36 so that the ramp 24 remains in the horizontal position.

As the ramp remains in the horizontal position, traffic moves between the dock and the vehicle across the ramp. When the vehicle is either completely loaded or unloaded so that the dock no longer need be utilized, the operator manually grasps the handle 68 and pulls the latch link 66 upwardly to the position illustrated in FIGURE 6. When the latch link 66 is in the position illustrated in FIGURE 6, the spring 54 rotates the weight arm 50 in a clockwise direction from the position illustrated in FIGURE 5 toward the position illustrated in FIGURE 2. During this movement, the member 74 moves forward or upward as viewed in FIGURE 6 and when the ramp returns to the vertical position, the pin 70 is moved to a position where the latch recess 72 will again abut the pin 70. When the weight 48 moves to the position illustrated in FIGURE 2, which is the low moment position the force applied by the spring means 36 is sufficient to pivot the ramp 24 upwardly to the substantially vertical stored position illustrated in FIGURE 1.

The ramp 24 remains in the substantially vertical position illustrated in FIGURE 1 until it is desired to be used again, at which time the procedure is repeated.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A dockboard assembly comprising: support means; a ramp pivotally connected at a first end thereof to said support means for pivotal movement between various lowered positions and a raised position and having a second end adapted to engage a vehicle; first biasing means urging said ramp toward said raised position; and control means operatively attached to said ramp for providing a moment due to gravity sufficient to maintain said ramp in a lowered position and for changing the moment due to gravity while said ramp is in a lowered position so that said ramp is pivoted toward said raised position solely by said first biasing means; said control means including a weight movable relative to said ramp between a low moment position toward said first end of said ramp and a high moment position toward said second end, and linkage means for moving said weight from said low moment position to said high moment position in response to pivotal movement of said ramp.

2. A dockboard assembly as set forth in claim 1 including second biasing means for urging said weight toward said low moment position, and latch means for maintaining said weight in said high moment position against the urging of said second biasing means.

3. A dockboard assembly as set forth in claim 2 including release means for releasing said latch means so that said second biasing means moves said weight to said low moment position whereby said first biasing means pivots said ramp to said raised position.

4. A dockboard assembly as set forth in claim 3 including a weight arm pivotally attached intermediate the ends thereof to said ramp, said weight being attached at one end of said weight arm, the other end of said weight arm coacting with said linkage means whereby said weight is moved in an arc between said low and high moment positions as the arm pivots.

5. A dockboard assembly as set forth in claim 4 wherein said linkage means includes a lever pivotally connected to said ramp and responsive to relative pivotal movement between said ramp and said support means to pivot said weight arm and thereby move said weight.

6. A dockboard assembly as set forth in claim 5 wherein said first biasing means includes a lift arm pivotally connected at a first end to said support means, and spring means interconnecting said lift arm and one of said support means and said ramp adjacent the pivotal connection of said ramp to said support means.

7. A dockboard assembly as set forth in claim 6 including actuating means operatively interconnecting said lift arm and said lever for pivoting said lever upon movement of said lift arm.

8. A dockboard assembly as set forth in claim 7 including guide means operatively interconnecting said weight arm and said ramp for supporting said weight arm intermediate said weight and the pivotal connection of said weight arm to said ramp.

9. A dockboard assembly as set forth in claim 8 including a pin supported by one end of the said lever, wherein said actuating means comprises a link pivotally connected at one end to the other end of said lever and pivotally connected at the other end to said lift arm, said latch means comprises a latch link rotatably connected at one end to said other end of said weight arm and having a latch recess for engaging said pin.

10. A dockboard assembly as set forth in claim 9 wherein said latch link comprises two members pivotally connected together to allow said latch recess to be disengaged from said pin, and wherein said release means coacts with the member with said latch recess therein for moving said latch recess out of engagement with said pin.

11. A dockboard assembly as set forth in claim 10 wherein said second biasing means comprises at least one spring interconnecting said weight arm and said ramp.

12. A dockboard assembly as set forth in claim 11 including a guide lever pivotally attached to the member with said latch recess therein and extending thereover, and third biasing means urging said guide lever against said pin for maintaining said member with said latch recess therein against said pin.

13. A dockboard assembly as set forth in claim 12 including a lip pivotally attached to said second end of said ramp, and means for locking said lip in an extended cantilevered position and for unlocking said lip to allow said lip to pivot to a position substantially perpendicular to said ramp.

14. A dockboard assembly comprising: support means, a ramp pivotally connected at a first end thereof to said support means for pivotal movement between various lowered positions and a raised position and having a second end adapted to engage a vehicle, first biasing means reacting between the support means and the ramp and urging said ramp toward said raised position, a weight movable relative to said ramp between a low moment position toward said first end of said ramp and a high moment position toward said second end of said ramp, said weight being movable between said first and second ends of said ramp, said weight acting against said biasing means in all positions, said weight being sufficient to provide a moment due to gravity acting against said first biasing means to maintain said ramp in a lowered position when in said high moment position and insufficient to do so when in said low moment position, and linkage means for moving said weight between said low and high moment positions so that the moment due to gravity may be changed while said ramp is in a lowered position and said ramp is pivoted toward said raised position solely by said first biasing means.

References Cited

UNITED STATES PATENTS

| 2,751,615 | 6/1956 | Kelley | 14—71 |
| 3,087,178 | 4/1963 | Loomis | 14—71 |

FOREIGN PATENTS

| 858,880 | 1/1961 | Great Britain. |

JACOB L. NACKENOFF, Primary Examiner